US007328501B2

(12) United States Patent
Smiley et al.

(10) Patent No.: US 7,328,501 B2
(45) Date of Patent: Feb. 12, 2008

(54) APPARATUS, A SYSTEM FOR SEPARATING A GEAR FROM A CAMSHAFT

(76) Inventors: Nathaniel Smiley, 1253 W. 95th Pl., Chicago, IL (US) 60643; Frank Smiley, 1253 W. 95th Pl., Chicago, IL (US) 60643

( * ) Notice: Subject to any disclaimer, the term of this patent is extended or adjusted under 35 U.S.C. 154(b) by 237 days.

(21) Appl. No.: 10/850,503

(22) Filed: May 20, 2004

(65) Prior Publication Data

US 2005/0257360 A1 Nov. 24, 2005

(51) Int. Cl.
*B23P 21/00* (2006.01)

(52) U.S. Cl. ........................................................ 29/721

(58) Field of Classification Search .................. 29/700, 29/259, 260, 426.5, 426.1, 235, 270, 721; 81/445; 51/445

See application file for complete search history.

(56) References Cited

U.S. PATENT DOCUMENTS 1,227,457 A * 5/1917 Langan ........................ 29/259
1,368,760 A 2/1921 Schilling
1,394,129 A 10/1921 Wickersham
1,446,102 A 2/1923 Oldershaw
2,253,411 A * 8/1941 Thompson .................. 29/256
2,860,407 A 11/1958 Grunder et al.
3,146,522 A 9/1964 Wright
3,599,311 A 8/1971 Ellis
4,372,024 A * 2/1983 Shevada ...................... 29/260
4,929,111 A 5/1990 Lauritano
5,257,445 A 11/1993 Mayberry
6,266,860 B1 7/2001 Kiebler
6,415,491 B1 7/2002 Klann
6,502,293 B1 1/2003 Khurana

* cited by examiner

*Primary Examiner*—John C. Hong
(74) *Attorney, Agent, or Firm*—Patents & TMS, P.C.

(57) ABSTRACT

An apparatus, a system and a method are provided to separate a gear from a shaft. The apparatus, the system and the method implement a base plate, a handle, a face plate, a first fastener, a second fastener, and/or a press. The gear is attached to a shaft of a motor. The fasteners connect and/or attach the face plate to the base plate. The fasteners extend through a passage in the gear. The gear is positioned between the face plate and the base plate which abuts a backside of the gear. The press is inserted into a central hole of the face plate and/or abuts a second side of the gear. The base plate maintains the gear in a stationary position with respect to the face plate and/or the press. The press engages the shaft and/or pulls the gear inward with respect to the face plate. As a result, a first side of the base plate moves the gear inward with respect to the face plate.

14 Claims, 3 Drawing Sheets

APPARATUS, A SYSTEM FOR SEPARATING A GEAR FROM A CAMSHAFT

BACKGROUND OF THE INVENTION

The present invention generally relates to an apparatus, a system and a method for separating a gear from a shaft. More specifically, the present invention generally relates to an apparatus, a system and a method for separating a gear from a camshaft of an engine. The apparatus, the system and the method may have a base plate, a handle, a face plate, a first fastener, a second fastener, and/or a press. The camshaft may extend from a motor of, for example, an automobile, a motorcycle, a diesel truck, a moped and/or the like. A thrust plate may be located between the gear and the motor. The gear may be, for example, press-fitted to the shaft. Still further, the first fastener and/or the second fastener may attach the face plate to the base plate and/or may extend through a first passage and/or a second passage in the gear. The base plate may abut a backside of the gear and/or may be located between the thrust plate and/or the gear and the motor. The press may be inserted into a central hole in the face plate such that a first end of the press abuts a second side of the gear. The press and/or the first fastener and/or the second fastener may be, for example, a screw, a bolt and/or the like. The base plate may hold, may restrain and/or may maintain the gear in a stationary position with respect to the face plate and/or the press. The press may engage the shaft and/or may pull the gear and/or the thrust plate outward with respect to the motor. The press may have a length which may allow the gear to be pulled from the shaft and/or to be separated from the shaft and/or the motor.

It is generally known that a gear is attached to a shaft and/or may be, for example, press-fitted to the shaft. The gear may be attached to the shaft in such a way to prevent or prohibit the gear from separating from the shaft. Further, a tool is traditionally required to aid a user with the removal and/or separation of the gear from the shaft. The tool exerts an outward force with respect to the motor. The gear moves outward with respect to the motor to separate from the shaft. Still further, the tool may be, for example, a hammer used by, for example, a mechanic to tap the gear off the shaft and/or outward with respect to the motor. However, the use of a tool to remove a gear from a shaft may result in, for example, damage to the gear, a thrust plate and/or teeth of the gear. Additionally, a press-fitted gear requires a large amount of force to be exerted upon the gear for removal of the gear from the shaft. Traditionally, the tool fails to exert the required force to separate the gear from the shaft and/or damages the gear, the thrust plate and/or the teeth of the gear during the removal of the gear from the shaft.

A need, therefore, exists for an apparatus, a system and a method for separating a gear from a camshaft. Additionally, a need exists for an apparatus, a system and a method for separating a gear from a camshaft which may prevent damage to the gear, the thrust plate and/or the teeth of the gear during the removal of the gear from the camshaft. Further, a need exists for an apparatus, a system and a method for separating a gear from a camshaft which may allow the gear to be removed from the camshaft while the camshaft remains inside and/or attached to the motor. Further, a need exists for an apparatus, a system and a method for separating a gear from a camshaft which allows the thrust plate to be removed from the shaft and/or to be separated from the motor. Still further, a need exists for an apparatus, a system and a method for separating the gear from the camshaft which may require a user to exert minimal force to remove the gear and/or the thrust plate from the camshaft.

SUMMARY OF THE INVENTION

The present invention generally relates to an apparatus, a system and a method for separating a gear from a shaft. More specifically, the present invention generally relates to an apparatus, a system and a method for separating a gear from a camshaft of an automobile engine. The apparatus, the system and the method may have a base plate, a handle, a face plate, a first fastener, a second fastener, and/or a press. Further a thrust plate may be located between the gear and the motor. Still further, the first fastener and/or the second fastener may connect and/or attach the face plate to the base plate. The first fastener and/or the second fastener may extend through a first passage and/or a second passage in the gear.

The gear may be positioned between the face plate and the base plate which may abut a backside of the gear and/or may be located between the thrust plate and/or the gear and the motor. The press may be inserted into a central hole of the face plate. The base plate may hold, may restrain and/or may maintain the gear in a stationary position with respect to the face plate and/or the press. The press may engage the shaft and/or may pull the gear outward with respect to the motor. The press may have a length which may allow the gear and/or the thrust plate to be pulled from the shaft and/or to be separated from the shaft and/or the motor.

In an embodiment of the present invention, an apparatus for separating a gear from a shaft having a first end and a second end opposite to the first end wherein the gear has a first side and a second side opposite to the first side wherein the gear has a passage extending through the gear from the first side to the second side of the gear and further wherein the gear is between the first end and the second end of the shaft is provided. The apparatus has a base having a notch, a front side and a backside opposite to the front side wherein the notch extends through the base from the first side to second side and further wherein the notch receives the shaft between the first side of the gear and the first end of the shaft wherein the front side of the base covers the first side of the gear. Further, the apparatus has a plate having a first side and a second side opposite to first side. Still further, the apparatus has a first fastener that attaches the plate to the base wherein the first fastener extends through the passage of the gear from the second side of the plate to the front side of the base wherein the front side of the base abuts the first side of the gear. Moreover, the apparatus has a press between the second side of the plate and the second end of the shaft.

In an embodiment, the apparatus has a hole in the base.

In an embodiment, the apparatus has a handle attached to the base.

In an embodiment, the apparatus has a slot in the plate.

In an embodiment, the apparatus has a recession surrounding the notch on the front side of the base.

In an embodiment, the first fastener has a threading.

In an embodiment, the press has a threading.

In an embodiment, the apparatus has a second fastener attaching the plate to the base.

In another embodiment of the present invention, a method for pulling a gear from a shaft wherein the gear has a first side and second side opposite to the first side is provided. The method has the steps of providing a base having a notch, a front side and a backside opposite to the front side wherein the notch extends through the base from the front side to backside of the base and connecting the notch of the base to the shaft wherein the front side of the base covers the first side of the gear. Further, the method has the step of attaching a plate to the base wherein the plate has a first side and a second side opposite to the first side and further wherein the second side of the plate is adjacent to the shaft and the second side of the gear. Moreover, the method has the step of pulling the gear inward with respect to the second side of the plate from the shaft with the front side of the plate.

In an embodiment, the method has the step of extending a fastener through the passage of the gear.

In an embodiment, the method has the step of inserting a press between the second side of the plate and the second end of the gear.

In an embodiment, the method has the step of pressing the plate outward with respect to the second end of the gear.

In an embodiment, the method has the step of pushing the gear outward with respect to the first end of the shaft with the front side of the base.

In an embodiment, the method has the step of attaching a handle to the base.

In another embodiment of the present invention, a system for separating a gear from a shaft wherein the gear has a passage extending through the gear is provided. The system has a base having a notch, a front side and a backside opposite to the front side wherein the notch extends through the base from the first side to the second side and further wherein the notch receives the shaft between the first side of the gear and the first end of the shaft wherein the front side of the base covers the first side of the gear. Further, the system has a pulling means connected to the base wherein the pulling means is adjacent to the gear and further wherein the pulling means extends through the passage of the gear to the front side of the base.

In an embodiment, the pulling means is a press abutting the second end of the shaft.

In an embodiment, the system has a fastener attaching the pulling means to the base via the passage of the gear.

In an embodiment, the system has a hole in the base.

In an embodiment, the system has a recession surrounding the notch on the front side of the base.

In an embodiment, the system has a plate enclosed between the first side of the gear and the front side of the base.

It is, therefore, an advantage of the present invention to provide an apparatus, a system and a method for separating a gear from a camshaft.

Another advantage of the present invention is to provide an apparatus, a system and a method for separating a gear from a camshaft which allows the removal of the gear from the shaft while the shaft remains connected to the motor.

Yet another advantage of the present invention is to provide an apparatus, a system and a method for separating a gear from a camshaft which allows a press to exert force on an end of the shaft to pull a gear from a shaft.

And, another advantage of the present invention is to provide an apparatus, a system and a method for separating a gear from a camshaft which is inexpensive.

Yet another advantage of the present invention is to provide an apparatus, a system and a method for separating a gear from a camshaft which is easy to assemble.

A further advantage of the present invention is to provide an apparatus, a system and a method for separating a gear from a camshaft which prevents damage to a thrust plate during the removal of the gear and/or the thrust plate from the shaft.

Moreover, an advantage of the present invention is to provide an apparatus, a system and a method for separating a gear from a camshaft which prevents damage to the gear during the removal of the gear from the camshaft.

And, another advantage of the present invention is to provide an apparatus, a system and a method for separating a gear from the camshaft which prevents damage to the camshaft during the removal of the gear from the camshaft.

Yet another advantage of the present invention is to provide an apparatus, a system and a method for separating a gear from a camshaft which prevents damage to the teeth of the gear during the separation of the gear from the camshaft.

Another advantage of the present invention is to provide an apparatus, a system and a method for separating a gear from a camshaft which provides a press to remove a gear from the camshaft.

Yet another advantage of the present invention is to provide an apparatus, a system and a method for separating a gear from a camshaft which allows a user to exert a torque force upon a press to remove the gear from the camshaft.

A still further advantage of the present invention is to provide an apparatus, a system and a method for separating a gear from a camshaft which prevents injury to a user during removal of a gear from the camshaft.

Moreover, an advantage of the present invention is to provide an apparatus, a system and a method for separating a gear from a camshaft which may provide a recession for removal of a thrust plate adjacent to the gear.

And, another advantage of the present invention is to provide an apparatus, a system and a method for separating a gear from a camshaft which provides a recession for the removal of a thrust plate from the shaft to prevent damage to the thrust plate during removal of the thrust plate from the shaft.

Yet another advantage of the present invention is to provide an apparatus, a system and a method for separating a gear from a camshaft which provides a handle to facilitate easy attachment of the base to the gear and/or the camshaft.

Moreover, an advantage of the present invention is to provide an apparatus, a system and a method for separating a gear from a camshaft which pulls the gear to be pulled outward with respect to the motor and/or pulls the gear inward with respect to a face plate.

Additional features and advantages of the present invention are described in, and will apparent from, the detailed description of the presently preferred embodiments and from the drawings.

DETAILED DESCRIPTION OF THE PRESENTLY PREFERRED EMBODIMENTS

The present invention generally relates to an apparatus, a system and a method for separating a gear from a shaft. More specifically, the present invention generally relates to an apparatus, a system and a method for separating a gear from a camshaft of an engine. The apparatus, the system and the method may have a base plate, a handle, a face plate, a first fastener, a second fastener, and/or a press. The gear may be connected and/or may be attached to a shaft, such as, for example, a camshaft of a motor, such as, for example, an automobile, a motorcycle, a diesel truck, a moped and/or the like. A thrust plate may be located between the gear and the motor. The gear may be, for example, press-fitted to the shaft. Still further, the first fastener and/or a second fastener may connect and/or may attach the face plate to the base plate. The first fastener and/or the second fastener may extend through the gear via a first passage and/or a second passage, respectively, in the gear. The base plate may abut a backside of the gear and/or may be located between the thrust plate and/or the gear and the motor. The press may be inserted into and/or may engage a central hole in the face plate. As a result, a first end of the press may abut a second side of the gear. The press and/or each of the pair of fasteners may be, for example, a screw, a bolt and/or the like. The base plate may hold, may retain and/or may maintain the gear in a stationary position with respect to the face plate and/or the press. The press may engage the shaft and/or may pull the gear inward with respect to the face plate. The press may have a length which may allow the gear to be pulled from the shaft and/or to be separated from the shaft and/or the motor.

Figure 2:
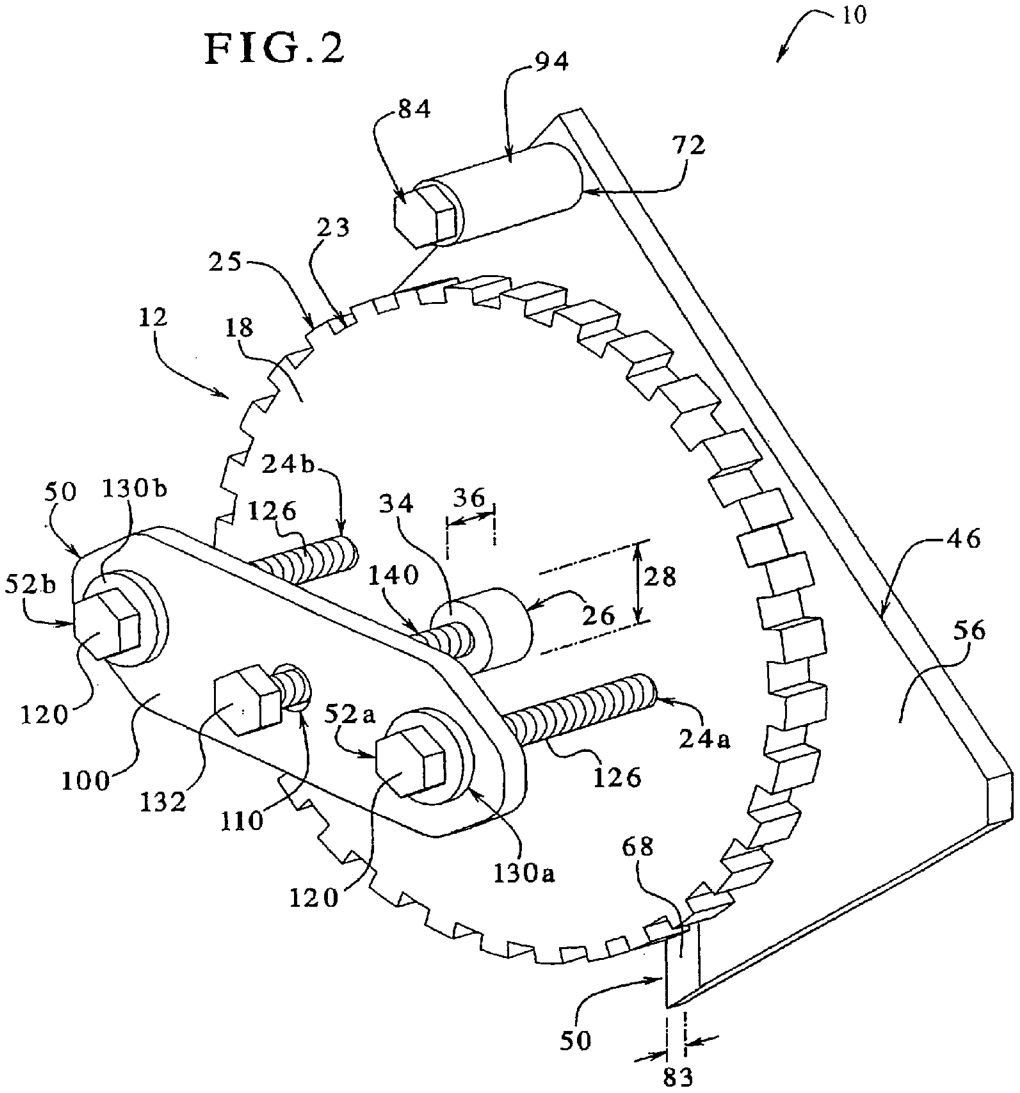
FIG. 2 illustrates a perspective view of an apparatus attached to a gear and/or a camshaft in an embodiment of the present invention.
Figure 3:
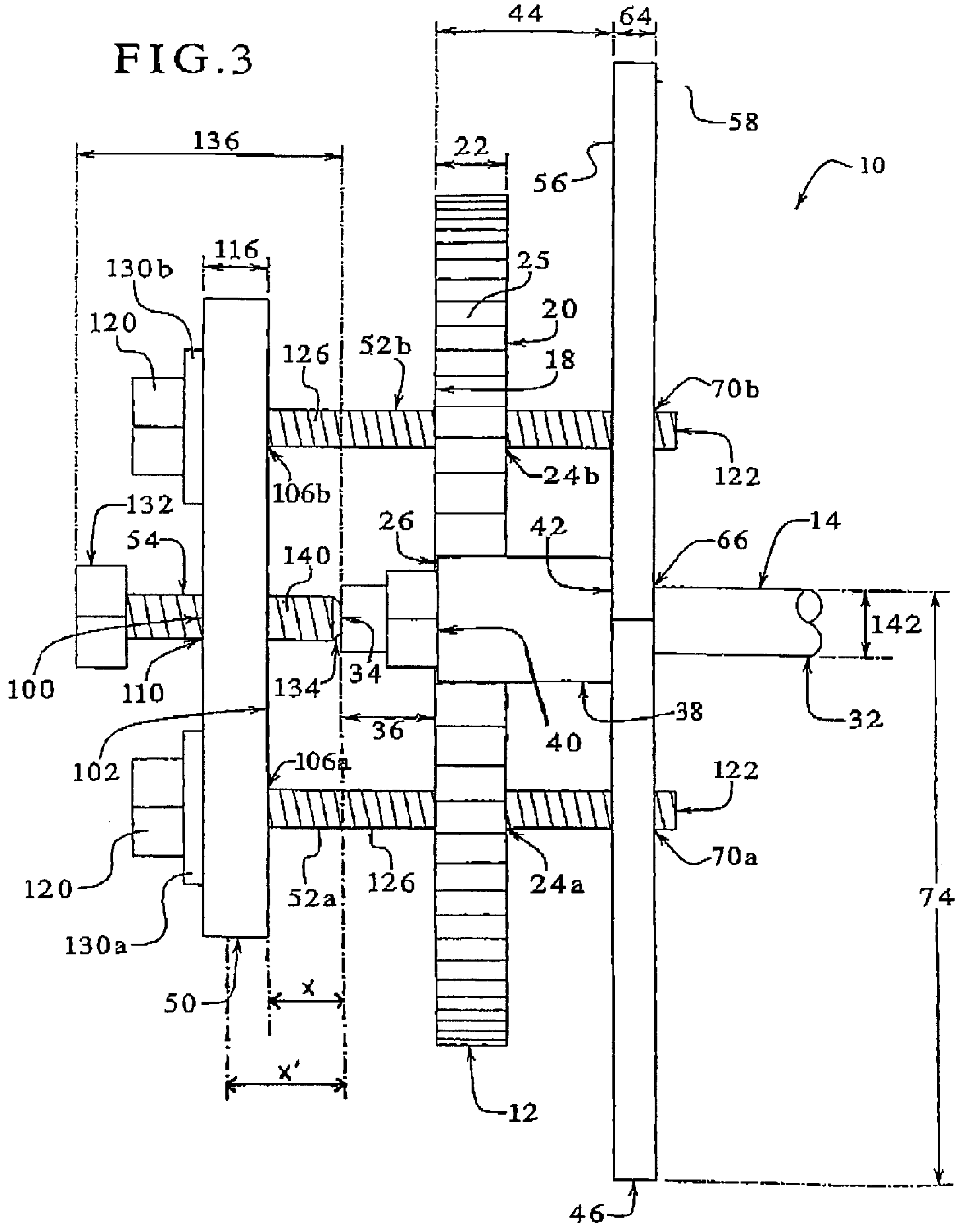
FIG. 3 illustrates a side plan view of the apparatus attached to the gear and/or the camshaft of FIG. 2 in an embodiment of the present invention.

Referring now to the drawings wherein like numerals refer to like parts, FIGS. 2 and 3 illustrate an apparatus 10 for separating a gear 12 from a shaft 14 which may be attached and/or may be connected to a motor (not shown). The shaft 14 may be, for example, a camshaft of the motor. The motor may be from, for example, an automobile, a motorcycle, a moped, a snowmobile, a diesel truck and/or the like.

The gear 12 may have a front side 18, a backside 20, a thickness 22 and/or a perimeter 23. The backside 20 may be opposite to the front side 18. Further, the perimeter 23 may have teeth 25 attached thereon. Still further, the gear 12 may have a first passage 24*a* and/or a second passage 24*b* and/or an orifice 26 which may be located between the passages 24*a*, 24*b*. The first passage 24*a* and/or the second passage 24*b* may have a diameter 28. The orifice 26 may have a diameter 30. The gear 12, the orifice 26 and/or the passages 24*a*, 24*b* may have a shape, such as, for example, a circle. The present invention should not be deemed as limited to a specific diameter of the passages 24*a*, 24*b*.

The shaft 14 may have a first end 32 and/or a second end 34. The second end 34 may be opposite to the first end 32. The second end 34 may be attached to and/or may be connected to the motor. The first end 32 may extend outward with respect to the motor. The first end 32 may be inserted into and/or may extend through the orifice 26 of the gear 12 from the front side 18 to the backside 20. The first end 32 may extend outward with respect to the first side 18 of the gear. The shaft 14 may have an extended length 36 which may extend from the first end 32 of the shaft 14 to the front side 18 of the gear 12. The gear 12 may be attached to the shaft 14 by, for example, press-fitting and/or the like. Moreover, the present invention should not be deemed as limited to a specific extended length of the shaft 14. It should be understood that the gear 12 may be attached to the shaft 14 by any method that may be implemented by one having ordinary skill in the art.

Figure 1:
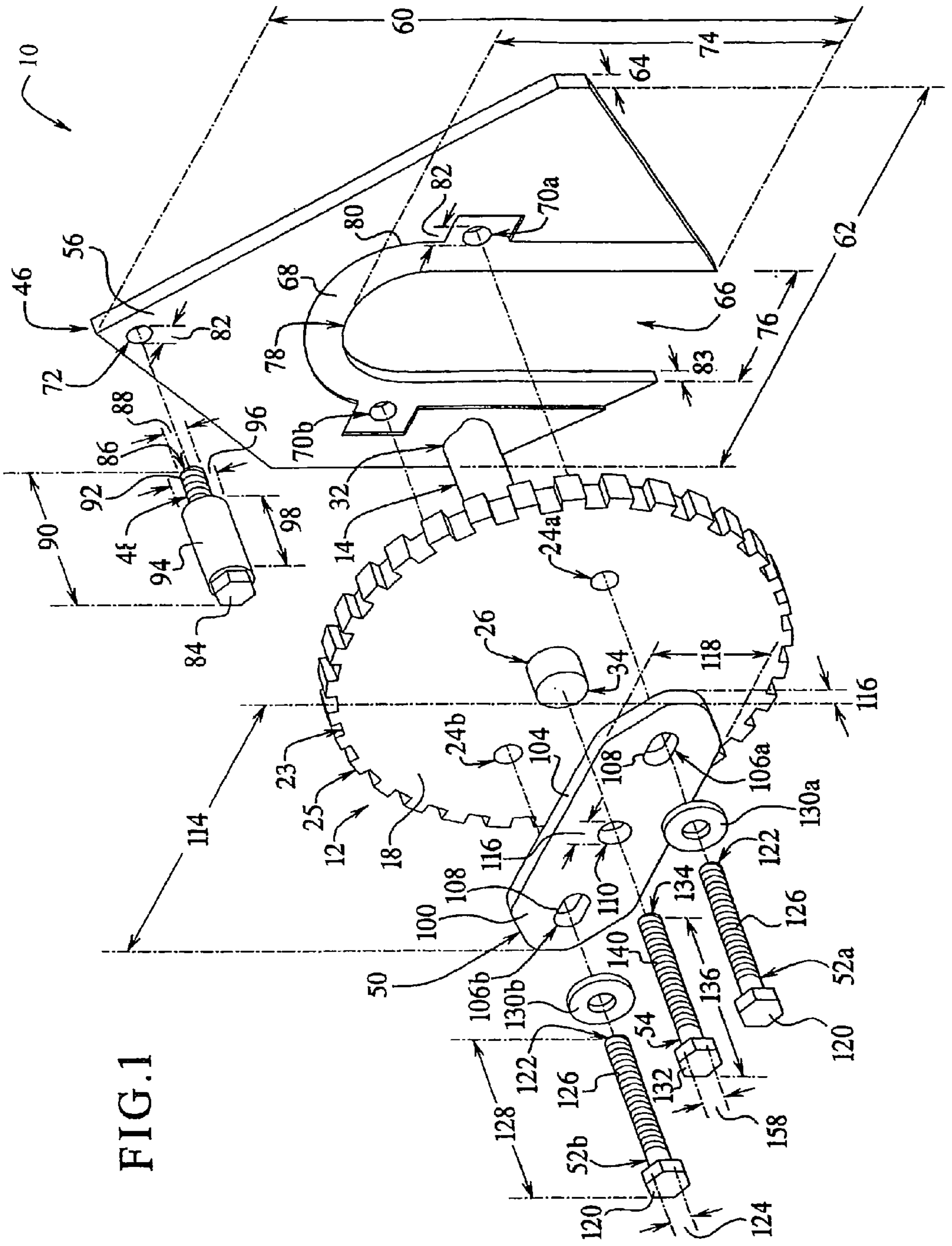
FIG. 1 illustrates an exploded perspective view of an apparatus attached to a gear and/or a camshaft in an embodiment of the present invention.

As illustrated in FIGS. 1 and 3, a thrust plate 38 may have a front side 40, a backside 42 and/or a thickness 44. The backside 42 may be opposite to the front side 40. The thrust plate 38 may be connected to the shaft 14. The front side 40 of the thrust plate 38 may abut the backside 20 of the gear 12. The shaft 14, the gear 12 and/or the thrust plate 38 may be made from, for example, steel or the like. Further, the present invention should not be deemed as limited to a specific thickness of the thrust plate 38. It should be understood that the thrust plate 38 may be attached to the shaft 14 by any method that may be implemented by one having ordinary skill in the art. The apparatus 10 may have a base plate 46, a handle 48, a face plate 50, a first fastener 52*a*, a fastener 52*b* and/or a press 54. The base plate 46 may have a front side 56, a backside 58, a height 60, a length 62 and/or a width 64. The backside 58 may be opposite to the front side 56. The length 62 may be, for example, six inches. The width 64 may be, for example, six inches. The height 60 may be, for example, five-sixteenths of an inch. Further, the base plate 46 may have a notch 66, a recession 68, a first mounting hole 70*a*, a second mounting hole 70*b* and/or a handle hole 72. The base plate 46 may be made from a material, such as, for example, steel and/or the like. The present invention should not be deemed as limited to a specific material, a specific length, a specific width and/or a specific height of the base plate 46.

The notch 66 may have a length 74, a width 76, and/or an end 78. The notch 66 may extend through the base 46 from the front side 56 to the backside 58. The length 74, may be, for example, four and one-half inches. The width 76 may be, for example, two inches. Further, the notch 66 may be, for example, U-shaped. Still further, the end 78 of the notch 66 may be, for example, rounded. The present invention should not be deemed as limited to a specific length, a specific shape and/or a specific width of the notch 66 of the base plate 46.

The recession 68 may be located on, for example, the front side 56 of the base plate 46. Further, the recession 68 may surround the notch 66 on the front side 56 of the base plate 46. The recession 68 may have a perimeter 80 and/or a height 83. The height 83 of the recession 68 may be, for example, one-sixteenth of an inch. The present invention should not be deemed as limited to a specific height of the recession 68.

The mounting holes 70*a*, 70*b* may be located within the recession 68. Further, the mounting holes 70*a*, 70*b* may have a diameter 82. The handle hole 72 may be located adjacent to the end 78 of the notch 66. The handle hole 72 may have a diameter 82. The diameter 82 of the mounting holes 70*a*, 70*b* and/or the handle hole 72 may be, for example, seven-sixteenths of an inch. Further, the handle hole 72 and/or each of the mounting holes 70*a*, 70*b* may be, for example, threaded. Still further, the mounting holes 70*a*, 70*b* and/or the handle hole 72 may extend through the base plate 46 from the front side 56 to the backside 58. The present invention should not be deemed as limited to a specific diameter of the mounting holes 70*a*, 70*b* and/or the handle hole 72.

The handle 48 may have a first end 84, a second end 86, a diameter 88 and/or a length 90. The second end 86 may be opposite to the first end 84 and/or may have a threading 92 thereon. Further, the handle 48 may have a housing 94 which may have a first end 95, a second end 97, a diameter 96 and/or a length 98. The second end 97 may be opposite to the first end 95. The diameter 88 of the handle 48 may be less than the diameter 96 of the housing 94. The length 90 of the handle 48 may be longer than the length 98 of the housing 94. The handle 48 may be inserted into the housing 94. As a result, the second end 86 of the handle 48 may extend outward with respect to the second end 97 of the housing 94. Still further, the first end 84 of the handle 48 may abut the first end 95 of the housing 94. The threading 92 on the second end 86 of the handle 48 may be inserted into and/or may connect to the handle hole 72. The threading 92 of the handle 48 may engage the handle hole 72. The diameter 88 of the handle 48 may be, for example, equal to the diameter 82 of the handle hole 72. The handle 48 may be attached to the base plate 48 via the handle hole 72. As a result, the first end 84 of the handle 48 may extend outward with respect to the front side 56 of the base plate 46. The second end 86 of the handle 48 may extend outward with respect to the backside 58 of the base plate 46. The handle 48 and/or the housing 94 may be made from a material, such as, for example, steel and/or the like. The present invention should not be deemed as limited to a specific length, specific material and/or a specific diameter of the handle 48 and/or the housing 94.

The apparatus 10 may have a face plate 50 which may have a first side 100, a second side 102, and/or a perimeter 104. The second side 102 may be opposite to the first side 100. Further, the face plate 50 may have a first slot **106*a*, a second slot 106*b* and/or a central hole 110. Each of the slots 106*a*, 106*b* may have a perimeter 108 and/or may extend through the face plate 50 from the first side 100 to the second side 102. The central hole 110 may be located between the slots 106*a*, 106*b*. The central hole 110 may have a diameter 112 and/or may extend through the face plate 150 from the first side 100 to the second side 102. Still further, the face plate 50** may be made from a material, such as, for example, steel and/or the like.

The face plate 50 may have a length 114, a width 118 and/or a height 118. The length 114 of the face plate 50 may be, for example, five inches. The width 116 of the face plate 50 may be, for example, a one-half of an inch. The height 118 of the face plate 50 may be, for example, two inches. The face plate 50 and/or each of the slots **106*a*, 106*b* may have a shape, such as, for example, a circle, an oval and/or the like. The central hole 110 may have a shape, such as, for example, a circle. The present invention should not be deemed as limited to a specific shape, a specific material, a specific length, a specific width and/or a specific height of the face plate 50. The present invention should not be deemed as limited to a specific shape and/or specific perimeter of each of the slots 106*a*, 106*b*. Additionally, the present invention should not be deemed as limited to a specific diameter of the central hole 110**.

The apparatus 10 may have a first fastener **52*a* and/or a second fastener 52*b* which may have a first end 120 and/or a second end 122. The second end 122 may be opposite to the first end 120. The second end 122 of each of the fasteners 52*a*, 52*b* may have a diameter 124 and/or a threading 126 thereon. The threading 126 of the fasteners 52*a*, 52*b* may engage the threading within each of the mounting holes 70*a*, 70*b*. Further, the diameter 124 of each of the fasteners 52*a*, 52*b* may be less than the diameter 82 of each of the mounting holes 70*a*, 70*b*. Still further, the fasteners 52*a*, 52*b* may be, for example, bolts, screws and/or the like. The diameter 124 of the fasteners 52*a*, 52*b* may be, for example, seven-sixteenths of an inch. The diameter 124 of each of the fasteners 52*a*, 52*b* may fit within the perimeter 108 of each of the slots 106*a*, 106*b*, respectively. As a result, each of the fasteners 52*a*, 52*b* may be inserted into and/or may extend through each of the slots 106*a*, 106*b*, respectively. The fasteners 52*a*, 52*b* may have a length 128 permitting each of the fasteners 52*a*, 52*b* to pass through the face plate 52 via the slots 106*a*, 106*b*, respectively, to engage the base plate 46. Washers 130*a*, 103*b* may be implemented with the fasteners 52*a*, 52*b* during insertion into the face plate 50. The washers 130*a*, 103*b* may be located between the first end 120 of the fasteners 52*a*, 52*b*, respectively, and the first side 100 of the face plate 50. The fasteners 52*a*, 52*b* may be made from a material, such as, for example, steel and/or the like. The present invention should not be deemed as limited to a specific material, a specific length and/or a specific diameter of each of the fasteners 52*a*, 52*b*. Furthermore, it should be understood that the fasteners 52*a*, 52*b*** may be any fastener that may be implemented by one having ordinary skill in the art.

The press 54 may have a first end 132, a second end 134, a length 136 and/or a diameter 138. The second end 134 may have a threading 140 and/or may be opposite to the first end 132. The threading 140 and/or the second end 134 of the press 54 may engage the central hole 110 and/or a threading within the central hole 110. Further, the diameter 138 of the press 54 may be, for example, equal to the diameter 112 of the central hole 110. Still further, the length 136 of the press 54 may be greater than the length 128 of the fasteners **52*a*, 52*b*. The press 54 may be, for example, a screw, a bolt and/or the like. The press 54 may be made from, for example, steel and/or the like. The present invention should not be deemed as limited to a specific material of the press 54. It should be understood that the press 54** may be any press that may be implemented by one having ordinary skill in the art.

As illustrated by FIGS. 2 and 3, the apparatus 10 may be assembled and/or attached to the shaft 14, the thrust plate 38 and/or the gear 12 of the motor. The threading 92 of the second end 86 of the handle 48 may be inserted into the handle hole 72 of the base plate 46. A user may use the handle 48 to hold and/or to maneuver the base plate 46. The base plate 46 may be connected and/or may be attached to the shaft 14 of the motor. The notch 66 of the base plate 46 may receive the second end 34 of the shaft 14 of the motor. The base plate 46 may be positioned between the motor and the gear 12 and/or the thrust plate 38. As a result, the front side 56 of the base plate 46 may abut the backside 42 of the thrust plate 38 and/or the backside 20 of the gear 12. Further, the recession 68 of the base plate 46 may receive the thrust plate 38. Still further, the thickness 44 of the thrust plate 38 may be less than the height 82 of the recession 68. As a result, the thrust plate 38 may be positioned within the recession 68 of the base plate 46.

The mounting holes **70*a*, 70*b* of the base plate 46 may align with the passages 24*a*, 24*b* of the gear 12. Further, the diameter 28 of each of the passages 24*a*, 24*b* may be greater than the diameter 82 of each of the mounting holes 70*a*, 70*b* of the base plate 46. Still further, the gear 12 and/or the base plate 46 may be rotated with respect to each other by a user to align the passages 24*a*, 24*b* of the gear 12 with the mounting holes 70*a*, 70*b*, respectively, of the base plate 46. Moreover, the end 78 of the notch 66 may rest upon the shaft 14 of the motor. Furthermore, the length 74 of the notch 66 of the base plate 46 may be greater than a diameter 142 of the shaft 14**.

The face plate 50 may be attached to the gear 12 and/or the base plate 46. The slots **106*a*, 106*b* of the face plate 50 may be aligned with the passages 24*a*, 24*b*, respectively, of the gear 12 and the mounting holes 70*a*, 70*b*, respectively, of the base plate 46. Further, the face plate 50 may be connected and/or may be attached to the gear 12 and/or the base plate 46 by the fasteners 52*a*, 52*b*. The fasteners 52*a*, 52*b* may be inserted into the slots 106*a*, 106*b*, respectively, of the face plate 50. As a result, the second end 122 and/or the threading 126 may extend outward with respect to the second side 102 of the face plate 50. Still further, the second end 122 and/or the threading 126 of the fasteners 52*a*, 52*b* may be inserted into the passages 24*a*, 24*b* of the gear 12 and/or the mounting holes 70*a*, 70*b*, respectively, of the base plate 46. As a result, the second end 122** and/or the threading

126 of each of the fasteners 52*a*, 52*b* may extend through each of the passages 24*a*, respectively, of the gear 12 and/or each of the mounting holes 70*a*, 70*b*, respectively, of the base plate 46. Still further, the second end 122 and/or the threading 126 of the fasteners 52*a*, 52*b* may engage the mounting holes 70*a*, 70*b*, respectively, and/or the threading within the mounting holes 70*a*, 70*b*, respectively, of the base plate 46. As a result, the face plate 50 may be attached to the base plate 46 such that the gear 12 and/or the thrust plate 38 is positioned between the face plate 50 and the base plate 46. The washers 130*a*, 130*b* may be positioned on the fasteners 52*a*, 52*b*, respectively. As a result, the washers 130*a*, 130*b* may be located between the first end 120 of the fasteners 52*a*, 52*b*, respectively, and the first side 100 of the face plate 50.

The press 54 may be attached to the apparatus 10 and/or the face plate 50 and the base plate 46. Further, the second end 134 and/or the threading 140 of the press 54 may be inserted into the central hole 110 of the face plate 50. As a result, the second end 134 and/or the threading 140 may extend outward with respect to the second side 102 of the face plate 50. The second end 134 and/or the threading 140 of the press 54 may engage the central hole 110 and/or the threading within the central hole 110 of the face plate 50. As a result, the press 54 may be attached to the face plate 50.

The press 54 may extend through the face plate 50 and/or the central hole 110. As a result, the second end 134 and/or the threading 140 of the press 54 may extend outward to a distance X from the second side 102 of the face plate 50. Further, the second end 134 of the press 54 may abut the shaft 14 and/or the second end 34 of the shaft 14. The press 54 and/or the threading 140 of the press 54 may be engaged to move the second end 134 outward a distance X'. As a result, the front side 56 of the base plate 46 may be pulled against the backside 42 of the thrust plate 38 and/or the backside 20 of the gear 12. Further, moving the second end 134 of the press 54 the distance X' may decrease the extended length 36 of the shaft 14 and/or may move the gear 12 outward with respect to the motor towards the second end 34 of the shaft 14. Still further, the gear 12 may be moved outward with respect to the motor towards the second end 34 of the shaft 14 according to the difference between the distance X and the distance X'.

The length 136 of the press 54 may be greater than the extended length 36 of the shaft 14. The first end 132 of the press 54 may move inward with respect to the first side 100 of the face plate 50. The difference between the distance X and the distance X' may increase as the length 136 of the press 54 extends outward with respect to the second side 102 of the face plate 50. Further, the difference between the distances X and X' may be greater than the extended length 36 of the shaft 14. As a result, the front side 56 of the base plate 46 and/or the fasteners 52*a*, 52*b* may pull the gear 12 and/or the backside 20 of the gear 12 inward with respect to the second end 34 of the shaft 14. Moreover, the front side 56 of the base plate 46 and/or the fasteners 52*a*, 52*b* may pull the gear inward with respect to the second side 102 of the face plate 50 beyond the second end 34 of the shaft 14. As a result, the gear 12 may be removed from the shaft 14.

The recession 68 in the front side 56 of the base plate 46 may pull the thrust plate 38 and/or the backside 42 of the thrust plate 38 inward with respect to the second end 34 of the shaft 14. The recession 68 of the front side 56 of the base plate 46 and/or the fasteners 52*a*, 52*b* may pull the thrust plate 38 and/or the backside 42 of the thrust plate 38 inward with respect to the second side 102 of the face plate 50 beyond the second end 34 of the shaft 14. Therefore, the gear 12 and/or the thrust plate 38 may be pulled from the second end 34 of the shaft 14 by the front side 56 of the base plate 46 and/or the recession 68 in the front side 56 of the base plate 46, respectively.

A user may connect the base plate 46 to the shaft 14 via the notch 66 in the base plate 46. The base plate 46 may be located between the backside 20 of the gear 12 and the first end 32 of the shaft 12. The user may pull the front side 56 of the base plate 46 to abut the backside 20 of the gear 12. The user may align the recession 68 on the front side 56 of the base plate 46 with the thrust plate 38. The backside 42 of the thrust plate 38 may abut the recession 68 of the base plate 46. As a result, the thrust plate 38 may be enclosed between the front side 56 of the base plate 46 and the backside 20 of the gear 12.

The user may insert the fasteners 52*a*, 52*b* into the slots 106*a*, 106*b*, respectively, of the face plate 50. As a result, the second ends 122 of the fasteners 52*a*, 52*b* may extend outward with respect to the second side 102 of the face plate 50. The user may align the fasteners 52*a*, 52*b* with the passages 24*a*, 24*b*, respectively, of the gear 12 and/or with the mounting holes 70*a*, 70*b*, respectively, of the base plate 46. The user may insert the fasteners 52*a*, 52*b* through the passages 24*a*, 24*b*, respectively, into the mounting holes 70*a*, 70*b*, respectively. The threading 126 of the fasteners 52*a*, 52*b* may engage the mounting holes 70*a*, 70*b*, respectively. As a result, the face plate 50 may be attached to the base plate 46 via the fasteners 52*a*, 52*b*. The user may apply, for example, a clockwise torque force to the fasteners 52*a*, 52*b* to secure the face plate 50 to the base plate 46. As a result, the base plate 46 may pull the face plate 50 inward with respect to the gear 12 and/or the shaft 14.

The user may insert the second end 134 of the press 54 into the central hole 110 of the face plate 50. The threading 140 of the second end 134 of the press 54 may engage the central hole 110 and/or may extend outward with respect to the second side 102 of the face plate 50. The user may exert, for example, a clockwise torque to the first end 132 of the press 54. As a result, the second end 134 of the press 54 may abut the second end 34 of the shaft 14. Further, the torque force may extend the second end 134 of the press 54 to the distance X from the second side 102 of the face plate 50. As a result, the face plate 50 may be pressed outward with respect to the second end 34 of the shaft 14. As a result, the base plate 46 and/or the gear 12 may be pulled inward with respect to the second end 34 of the shaft 14 by the press 54 and/or the face plate 50.

The user may apply a torque force to move the second end 134 of the press 54 to the distance X' from the second side 102 of the face plate 50. The distance X' may be greater than the extended length 36 between the second end 34 of the shaft 14 and the front side 18 of the gear. As a result, the base plate 46 and/or the gear 12 may be pulled from the second end 34 of the shaft 14. As a result, the gear 12 and/or the thrust plate 38 may be separated from the shaft 14.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An apparatus for separating a gear from a shaft having a first end and a second end opposite to the first end wherein the gear has a first side and a second side opposite to the first side wherein the gear has a passage extending through the gear from the first side to the second side of the gear and further wherein the gear is between the first end and the second end of the shaft, the apparatus comprising:

a base plate having a notch, a front side and a backside opposite to the front side wherein the base plate has a first thickness between the front side of the base plate and the backside of the base plate wherein the base plate has edges defining the notch wherein the notch extends through the base plate from the front side of the base plate to the backside of the base plate and further wherein the notch is sized to receive the shaft between the first side of the gear and the first end of the shaft wherein the base plate has a second thickness which is adjacent to the edges of the base plate wherein the second thickness is less than the first thickness;

a face plate having a first side and a second side opposite to first side;

a first fastener that attaches the face plate to the base plate wherein the first fastener extends through the passage of the gear from the second side of the face plate to the front side of the base plate wherein the front side of the base plate abuts the first side of the gear; and a press between the second side of the face plate and the second end of the shaft.

2. The apparatus of claim 1 further comprising:

a hole in the base plate.

3. The apparatus of claim 1 further comprising:

a handle attached to the base plate.

4. The apparatus of claim 1 further comprising:

a slot in the face plate.

5. The apparatus of claim 1 further comprising:

a recession surrounding the notch on the front side of the base plate.

6. The apparatus of claim 1 wherein the first fastener has a threading.

7. The apparatus of claim 1 wherein the press has a threading.

8. The apparatus of claim 1 further comprising:

a second fastener attaching the face plate to the base plate.

9. A system for separating a gear from a shaft wherein the gear has a passage extending through the gear wherein the gear has a first side and a second side opposite to the first side wherein the shaft has a first end and a second end opposite to the first end, the system comprising:

a base having a notch, a front side and a backside opposite to the front side wherein the base has a hole having a circumference defined by the base wherein the hole extends through the base from the front side of the base to the backside of the base wherein the notch extends through the base from the front side of the base to the backside of the base and further wherein the notch is sized to receive the shaft between the first side of the gear and the first end of the shaft; and a pulling means connected to the base wherein the pulling means is adjacent to the gear wherein the pulling means extends through the passage of the gear into the hole of the base wherein the hole of the base is sized to receive the pulling means wherein the pulling means is attached to the base via the hole.

10. The system of claim 9 wherein the pulling means has a press abutting the second end of the shaft.

11. The system of claim 9 further comprising:

a fastener attaching the pulling means to the base via the passage of the gear.

12. The system of claim 9 further comprising:

a handle on the base.

13. The system of claim 9 further comprising:

a recession surrounding the notch on the front side of the base.

14. The system of claim 9 further comprising:

a plate enclosed between the first side of the gear and the front side of the base.

* * * * *

UNITED STATES PATENT AND TRADEMARK OFFICE

CERTIFICATE OF CORRECTION

PATENT NO. : 7,328,501 B2 
APPLICATION NO. : 10/850503
DATED : February 12, 2008
INVENTOR(S) : Smiley et al.

It is certified that error appears in the above-identified patent and that said Letters Patent is hereby corrected as shown below:

Title Page and lines 1-2, item (54): Change “APPARATUS, A SYSTEM FOR SEPARATING A GEAR FROM A CAMSHAFT” to --APPARATUS, A SYSTEM AND A METHOD FOR SEPARATING A GEAR FROM A CAMSHAFT--

Signed and Sealed this

Ninth Day of September, 2008

JON W. DUDAS
*Director of the United States Patent and Trademark Office*

UNITED STATES PATENT AND TRADEMARK OFFICE

CERTIFICATE OF CORRECTION

PATENT NO. : 7,328,501 B2
APPLICATION NO. : 10/850503
DATED : February 12, 2008
INVENTOR(S) : Smiley et al.

It is certified that error appears in the above-identified patent and that said Letters Patent is hereby corrected as shown below:

Title Page, item (54) and Column 1, lines 1 and 2: Change "APPARATUS, A SYSTEM FOR SEPARATING A GEAR FROM A CAMSHAFT" to --APPARATUS, A SYSTEM AND A METHOD FOR SEPARATING A GEAR FROM A CAMSHAFT--

This certificate supersedes the Certificate of Correction issued September 9, 2008.

Signed and Sealed this

Thirtieth Day of September, 2008

JON W. DUDAS
*Director of the United States Patent and Trademark Office*